UNITED STATES PATENT OFFICE.

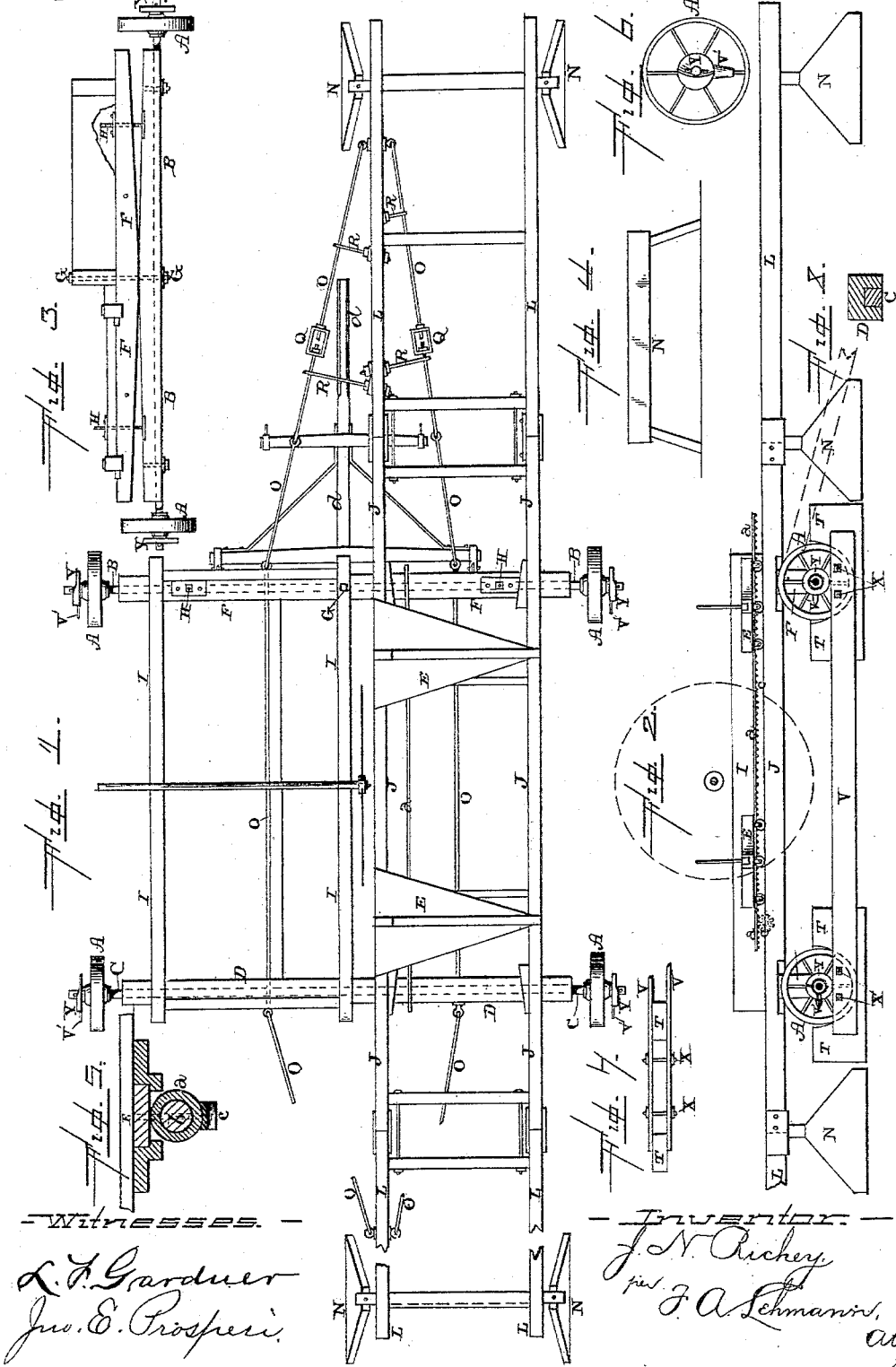

JAMES N. RICHEY, OF WAYNESBOROUGH, PENNSYLVANIA, ASSIGNOR TO THE FRICK COMPANY, OF SAME PLACE.

PORTABLE SAW-MILL.

SPECIFICATION forming part of Letters Patent No. 331,653, dated December 1, 1885.

Application filed September 2, 1885. Serial No. 176,033. (No model.)

*To all whom it may concern:*

Be it known that I, JAMES N. RICHEY, of Waynesborough, in the county of Franklin and State of Pennsylvania, have invented certain new and useful Improvements in Portable Saw-Mills; and I do hereby declare the following to be a full, clear, and exact description of the invention, such as will enable others skilled in the art to wh ch it pertains to make and use it, reference being had to the accompanying drawings, which form part of this specification.

My invention relates to an improvement in portable saw-mills; and it consists in, first, a portable saw-mill, in which the axle and the mud-sill are secured together or formed in a single piece; second, the combination of the front axle, a mud-sill which forms a bolster and is placed thereon, and which is made adjustable for the purpose of leveling the mill while in operation, and by means of which the front wheels can be turned freely in any direction; third, the combination of that part of the frame or mill which is rigidly secured to the sills, with those portions of the ways which are loosely connected thereto and form an extension of the ways at each end of the frame, and which movable portions are adapted to be folded back on top of the frame while the mill is being moved from place to place; fourth, the combination of the stationary part of the mill, which is secured to the mud-sills, with the movable portion of the ways, and the jointed braces for securing the movable portions of the ways in position; fifth, the combination of the wheels, recessed blocks to receive them while the mill is at work, boards which are applied to opposite sides of the wheels and blocks, and clamping-bolts for securing the parts together and locking the wheels in place; sixth, the combination of the two parts of the head-block provided with wheels, with a toothed rod or pipe for connecting them together; seventh, the cam-washers, by means of which the ground-wheels are locked against lateral motion while the machine is in operation.

The object of my invention is to produce a portable saw-mill which can be hauled like a wagon to any desired place, the movable parts quickly adjusted into position, the desired quantity of lumber sawed, and then the movable parts again packed upon the frame, ready to be moved to some other place.

Figure 1 is a plan view of a mill embodying my invention. Fig. 2 is a side elevation of the same. Fig. 3 is an end view. Figs. 4, 5, 6, 7, and 8 are detail views of the same.

A represents the driving-wheels, which are made, preferably, of the same size; B, the front axle, and C the rear one. The rear sill, D, is placed solidly upon the rear axle, or, if so preferred, the rear sill and axle may be made in a single piece, in which case the rear wheels will be placed on spindles which are attached directly to the ends of the combined sill and axle. If the rear axle and sill are made separately, the axle may be made of iron and then placed in a groove which is made in the under side of the axle, as shown. The sill F upon the front axle is secured in place by means of the bolt G, which passes down through the husk, the sill, and the axle, and which serves as the pivot upon which the axle B turns, so that the mill can be turned and moved freely about, like a common wagon. While the mill is being moved about, the nut on the bolt G will be loosened enough to allow a free movement of the axle; but when the mill is to be put into operation the nut will be tightened up so as to hold the parts rigidly together, and at the same time the clamping-bolts or set-screws H will be adjusted, so that the sill F will not only assume a horizontal position, but be locked rigidly in line with the front axle. The rear sill, D, not having any adjustment by means of screws, must first be adjusted into a horizontal position by means of devices of any kind, which are placed under the wheels in case the ground is not perfectly level. After the front sill has been leveled up and locked in place the other parts are to be secured in position. The two sills are secured rigidly together by means of the husk I, ways J, and the braces or tie-rods. The head-blocks consist of the two triangular frames E, which are mounted upon wheels in the usual manner, and which are connected together by means of the pipe $a$, upon which the two frames can be moved back and forth in any desired relation to each other and then locked in place. Inside of the pipe is placed a wooden rod, b, for the purpose of strengthening and bracing the pipe and preventing it from springing in any direction. The teeth c are cast separately and then bolted to the under side of the pipe, and which also help to brace and strengthen the pipe. After the stationary part of the frame-work has been leveled in place the movable portions L of the way are placed in position at each end of the frame and supported upon suitable supports, N, of which there will be any desired number. These movable parts L of the ways are then bolted rigidly in place by the jointed brace-rods O, which are provided with swivels Q for loosening and tightening the rods, as may be desired. After the rods O have been tightened in place by means of the swivels the inner portion of the way or tracks is straightened out and prevented from getting out of true by reason of the strain exerted upon it by the brace-rods by means of a number of tie-rods, R, which pass through that portion of the way or track, and are fastened at their other ends directly to the tie-rods O. These rods R are provided with adjusting-nuts and can be loosened or tightened at will. When the mill is to be moved, the rods O are detached by means of the swivels, the jointed portion turned back over the top of the frame, the movable portions of the ways also turned back over the top of the frame, the supports N also piled upon the frame, and then the machine is ready to be moved to some other place after the wheels have been unlocked and the front sill loosened.

While the mill is in operation, in order to lock it rigidly in place each one of the wheels A is placed in a recessed frame, T, which corresponds to the shape of the wheels. Then two planks, V, are applied to opposite sides of both wheels and frames, and then clamping-bolts X are passed through the planks and wheels, and the wheels then locked so that the frame cannot move either forward or back.

In order to keep the frame from having any lateral play while the mill is in operation, washers Y, which are made partially wedge-shaped and provided with handles V', are used on the spindles outside of the wheels. When the mill is being moved about, these washers are turned so that their thin flat portions come against or opposite the linchpin, and then the wheels have just enough lateral play to enable them to turn freely without unnecessary friction. When the mill is about to be used, these washers are turned on the spindles, so as to bring their wedge-shaped parts to bear against the linchpins, and thus lock the wheels so tightly in place that the frame can have no lateral play whatever. To the front axle is secured the tongue d, to which the team is secured when the mill is to be moved from place to place. This tongue, being fastened on below the level of the ways, need never to be removed, as it does not interfere at any time with the operation of the mill.

Having thus described my invention, I claim—

1. In a portable saw-mill, the rear sill or axle provided with wheels, the front axle, also provided with wheels, the front sill, which is adjustably secured upon the top of the front axle, the husk and ways which are placed upon the tops of the two sills and connect them together, the saw which is journaled upon the husk, and the carriage which moves back and forth upon the ways, substantially as shown.

2. In a portable saw-mill, the combination of the rear sill and axle, combined together so as to form practically one piece, and provided with wheels, the front axle, the front sill, which is adjustably secured upon the front axle, the husk and ways which are placed upon the tops of the wheels and connect them together, the saw, and the carriage which moves back and forth upon the ways, substantially as described.

3. In a portable saw-mill, the combination of the rear sill or axle provided with wheels, the front axle, the front sill, adjustably secured thereon, the husk, the ways, tie-rods which secure the two sills together, the saw, and the carriage which moves back and forth upon the ways, substantially as set forth.

4. The combination of the front axle provided with wheels, the front sill adjustably secured thereto, and devices for passing through the sill and securing it rigidly in position in a line with the front axle while the mill is in operation, with the husk and ways, the rear axle provided with wheels, the saw, and the carriage which moves back and forth upon the ways, substantially as specified.

5. The combination of the rear sill or axle, the front axle, the front sill which is adjustably mounted thereon, the husk and ways which connect the two sills together, the saw, and the carriage, with the movable parts of the ways which are mounted upon supports and then secured rigidly in position in line with the stationary part of the ways by means of tie-rods which extend from the ends of the husks and ways, and which are fastened at one end to opposite sides of one of the tracks, substantially as shown.

6. The combination of the rear sill or axle, the front axle, the front sill movably secured thereon, the husk and ways which connect the two sills rigidly together, the saw, and the carriage, with the movable portions of the ways, the tie-rods provided with swivels, the adjusting-rods which are passed through one of the ways and connect with the tie-rods, and suitable supports for the movable parts of the ways, substantially as described.

7. In a portable saw-mill, the combination of the rear sill or axle provided with wheels, the front axle, also provided with wheels, the front sill which is adjustably secured upon the front axle, the husk and ways which connect the two sills together, the saw, and the carriage which moves back and forth on the ways, with the recessed blocks or frames which are placed under the wheels, the planks which are applied to the blocks and connect them together, and the bolts which secure the blocks and plank together, substantially as set forth.

8. The combination, in a saw-mill, of the two triangular frames of the head-block, placed upon the ways and provided with suitable wheels or rollers for moving on the ways, the pipe which connects the two frames of the head-block together, the rod placed inside of the pipe, and the teeth which are formed upon or secured to the under side of the pipe, and a means for moving the carriage back and forth by means of the pipe, substantially as specified.

9. The combination, in a portable saw-mill, of the rear sill or axle, the front sill, wheels which are applied to the axles, the husk, saw, ways, and carriage which moves back and forth on the ways, with clamping devices which are applied to the wheels so as to lock them rigidly to their axles, and thus prevent the frame of the saw-mill from swaying laterally while the mill is in operation, substantially as described.

In testimony whereof I affix my signature in presence of two witnesses.

J. N. RICHEY.

Witnesses:
S. B. RINEHART,
F. A. LEHMANN.